United States Patent Office 3,549,667
Patented Dec. 22, 1970

3,549,667
PREPARATION OF ARYL SUBSTITUTED HYDROXY ANTHRAQUINONES
Klaus Wunderlich and Hans-Samuel Bien, Leverkusen, and Fritz Baumann, Opladen, Germany, assignors to Farbenfabriken Bayer Aktiengesellschaft, Leverkusen, Germany, a corporation of Germany
No Drawing. Continuation of application Ser. No. 251,021, Jan. 14, 1963. This application Feb. 23, 1967, Ser. No. 618,238
Claims priority, application Germany, Jan. 12, 1962, F 35,758
Int. Cl. C09b 1/50, 1/06
U.S. Cl. 260—380    4 Claims

ABSTRACT OF THE DISCLOSURE 3-aryl substituted hydroxy anthraquinones and a process for producing such compounds by reacting the corresponding boric acid ester of 1,5-dihydroxy-4,8-dinitro anthraquinones with a hydroxy-phenyl, hydroxy-lower alkoxy-phenyl, or lower alkoxy phenyl reactant in the presence of an acid condensing agent of strongly acid nature such as sulfuric acid or a sulfuric-acetic acid mixture at −20° C. to 25° C. and thereafter hydrolyzing the resulting ester.

---

This application is a continuation application of Ser. No. 251,021, filed on Jan. 14, 1963 and now abandoned, and relates to new aryl substituted hydroxy anthraquinones, a process for their production and to dyeings with these dyestuffs.

It has been found that valuable new aryl substituted hydroxy anthraquinones can be obtained by a new type of process by reacting the boric acid ester of 1,5-dihydroxy-4,8-dinitroanthraquinone in the presence of acid condensing agents with optionally esterified hydroxy aryl compounds, hydrolyzing the boric acid ester group in the compounds obtained and if desired reducing the nitro groups to amino groups.

The new process leads mainly to hydroxy anthraquinones of the formula:

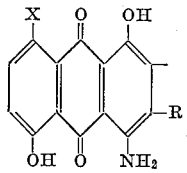

In this formula R stands for an optionally esterified hydroxy aryl radical and X stands for an amino or nitro group. Small quantities can also be obtained of anthraquinones which contain a further optionally esterified hydroxy aryl radical in o-position to the substituent X.

The reaction of the boric acid ester of 1,5-dihydroxy-4,8-dinitro-anthraquinones with the hydroxy aryl compound or with the ethers is in general performed between −20° C. and +25° C. Temperature ranges above 0° C., are in many cases usable with advantage, in order to bring about the aryl substitution in 3-position of the 1,5-dihydroxy-anthraquinones as completely as possible.

The condensing agents to be employed according to the invention are of strongly acid nature. On account of the cheapness and the especially favourable process conditions and yields, sulfuric acid of various concentrations is preferably used, most preferably a 90% concentration of sulfuric acid. The reaction mixture generally consists, apart from the starting components, of the condensing agent itself or suitable mixtures thereof, e.g. sulfuric acid mixed with smaller proportions of acetic acid. Organic liquids may be employed as reaction media as well.

As hydroxy aryl compounds, phenol and its substitution products are suitable, for example, hydroxy, alkoxy, halogen or alkyl-substituted phenols as well as alkyl ethers of the phenols or their substitution products. The alkyl radicals are preferably lower alkyl radicals with up to 4 carbon atoms. Examples of these compounds are phenol, o-cresol, anisole, phenetole, resorcinol and resorcinol-dimethyl ether and the ethyl or propyl ether.

The anthraquinone and the hydroxy aryl compounds are generally reacted in approximately equimolar amounts, a smaller excess of the hydroxy aryl compound being expedient. In cases where the hydroxy aryl compounds are applied in a somewhat greater excess, the partial diarylation of the anthraquinones already mentioned can also occur.

From German patent specifications 445,269, 446,563 and 456,235 various processes are already known for the production of 1,5-dihydroxy naphthalene compounds aryl-substituted in the 2-position, in which 1,5-dihydroxy-4,8-diamino-anthraquinone-2,6-disulfuric acid is reacted in the presence of boric acid in concentrated sulfuric acid, with phenols, naphthols, anisoles and the like to addition products, which can be transformed by subsequent treatment with acids or alkalies with exchange of the 2-position sulfonic groups into the corresponding aryl-substituted compounds, and in which the 6-position sulfonic group can also be subsequently removed. In contrast to the previously known process, the processes according to the present application starts from 5,8-dinitro- instead of the 5,8-diamino compounds; it leads to end products which are distinctly different in their color and their physical and technical properties from the previously known compounds and, therefore, in contrast to the latter represent the 3-aryl substituted anthraquinones.

The new products are blue deystuffs which are suitable as such, or preferably in the form of aqueous suspensions especially for dyeing and printing of synthetic and semi-synthetic fibres, e.g. for dyeing and printing cellulose esters, cellulose triacetate, synthetic polyamide-, polyurethane- and polyester-fibres, especially polyethyleneglycol terephthalate fibres. On these fibre materials dyeings are obtained with good to very good fastness properties, particularly good to very good fastness to light and sublimation.

EXAMPLE 1

(a) 16.5 grams of 1,5 - dihydroxy-4,8-dinitro-anthraquinone are dissolved at room temperature in a mixture of 370 grams of concentrated sulfuric acid and 25 grams of boric acid. After cooling to −15° C., sufficient methoxy benzene is added dropwise slowly so that the starting product completely disappears. After further stirring for one hour it is put on ice and the aqueous suspension obtained is boiled to destroy the boric ester. After filtering and washing neutral, the moist filter cakes are reduced by boiling for two hours with 80 grams of an aqueous 18% sodium hydrogen sulfide solution in 500 grams of water and 200 grams of ethanol. It is filtered off while cold and washed until neutral. The moist filter cakes are boiled with dilute hydrochloric acid, filtered off, washed neutral and dried.

A blue dyestuff of the formula

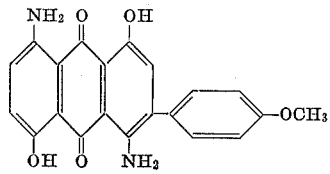

is obtained in almost quantitative yield which dissolves in concentrated sulfuric acid with a brown color.

(b) A corresponding dyestuff is obtained if o-methyl phenol is used instead of methoxybenzene.

(c) If the mixture of substances obtained in Example 1a after the removal of the boric ester and before the reducing, is boiled several times with dilute soda solution the following corinth colored dyestuff is obtained in a pure form.

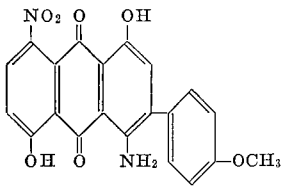

From the soda-alkaline filtrate the following brown compound is obtained by acidifying, filtering off, washing neutral and drying. It can be purified by recrystallization for example from trichloro benzene.

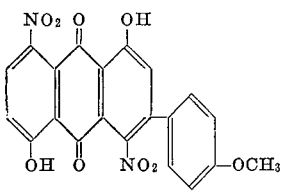

Reduction of the 1,5 - dihydroxy-4,8-dinitro-3-(p-methoxyphenyl)-anthraquinones thus obtained by means of sodium sulfide solution leads to the blue dyestuff according to Example 1a in very pure form. After recrystallization for example from aniline, it appears analytically pure in blue needles.

Calculated (percent): C, 67.10; H, 4.26; O, 21.30; N, 7.45. Found (percent): C, 66.7; H, 4.52; O, 20.96; N, 7.13.

EXAMPLE 2

16.5 grams of 1,5-dihydroxy-4,8-dinitro-anthraquinone are introduced into a mixture of 420 grams of concentrated sulfuric acid and 25 grams boric acid at room temperature. After dissolving has occurred the solution is cooled to $-15°$ C. 11 grams of o-methyl phenol are added in small portions within 1½ hours with good stirring. In the course of the reaction the resulting dye precipitates violet-red to blue. After stirring for 1½ hours at $-15°$ C. it is put on ice and the aqueous suspension obtained is boiled for some time to destroy the boric ester. After filtering off and washing neutral, the moist filter cakes are first reduced with sodium hydrogen sulfide in a similar manner to that described in Example 1a, then neutralized with sodium hydrogen sulfide, filtered off and thoroughly washed with hot water. The moist filter cakes are then boiled in dilute hydrochloric acid, filtered off, washed neutral and dried. The blue dyestuff obtained in quantitative yield dissolves in concentrated sulfuric acid with a brown color. The dyestuff consists of a mixture which consists of up to approximately 80% of the dyestuff of the formula

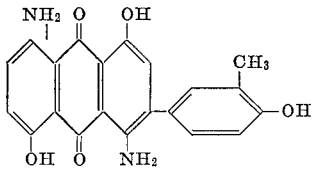

and approximately 20% of the dyestuff of the formula

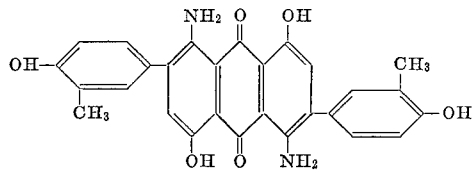

The compounds can be isolated according to customary methods.

If more or less o-methyl phenol is used, the diaryl compound is obtained in greater or lesser proportions.

EXAMPLE 3

16.5 grams of 1,5-dihydroxy-4,8-dinitro-anthraquinone are reacted with 11 grams of resorcinol according to the description of Example 2. The blue dyestuff obtained after reducing can be freed from the 1,5-dihydroxy-4,8-diamino-anthraquinone by way of the alkali metal salt. The dyestuff consists of a mixture of approximately 80% of the dyestuff of the formula

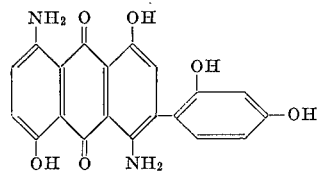

and approximately 20% of the dyestuff of the formula

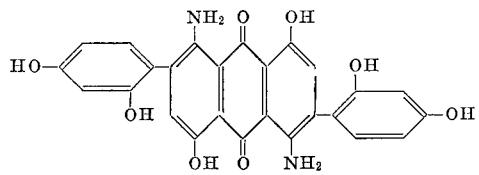

EXAMPLE 4

16.5 grams of 1,5-dihydroxy-4,8-dinitro-anthraquinone are reacted with ethoxy benzene until the starting material is no longer detectable. After reducing, a blue dyestuff is obtained of the formula

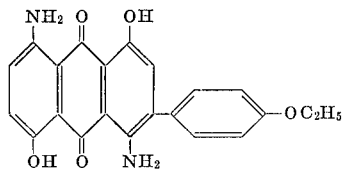

which dissolves in concentrated sulfuric acid with a brown color and can be purified if desired.

EXAMPLE 5

(a) 33 grams of 1.5-dihydroxy-4.8-dinitro-anthraquinone are dissolved at room temperature in a mixture of 740 grams of concentrated sulfuric acid and 50 grams of boric acid. After cooling to $-18°$ C., 24 grams methoxy benzene are slowly added dropwise. After 15 minutes further stirring the mixture is put on ice and the aqueous suspension obtained is boiled to destroy the boric ester. After filtering and washing the residue neutral it is dried. The dyestuff mixture obtained consists essentially of the following compound:

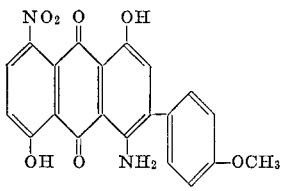

The dyestuff mixture also contains approximately 20% by weight each of dyestuffs of the formulae

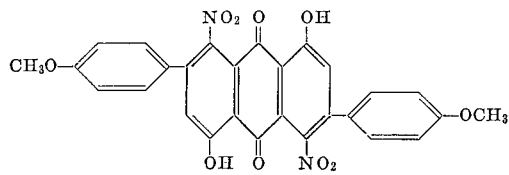

and

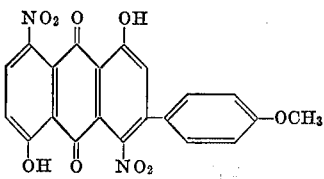

The compounds can be obtained in isolated form by known methods, e.g. by alkaline extraction or chromatographic methods.

(b) Similar dyestuff mixtures are obtained if 2-methyl phenol or ethoxy benzene or 1.3-dihydroxy benzene are used instead of methoxy benzene.

EXAMPLE 6

(a) 20 grams of the dyestuff mixture obtained according to Example 5a are reduced by boiling for two hours with a solution of 100 grams of sodium sulfide (crystallized) in 500 grams of water and 50 grams of alcohol. It is filtered while hot and washed neutral. The moist filter cakes are boiled with dilute hydrochloric acid, filtered off, washed neutral and dried. The blue dyestuff obtained in very good yield consists essentially of the dyestuff also obtained according to Example 1a. It contains further approximately 20% of

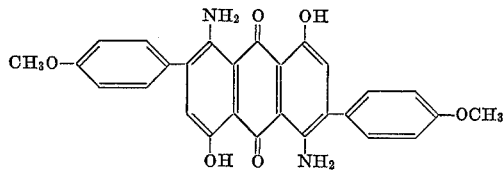

(b) Corresponding dyestuff mixtures are obtained if the dyestuff mixtures obtained according to Example 5b are reduced according to the process of Example 6a.

EXAMPLE 7

10 parts by weight of rope material of polyethylene glycol terephthalate are dyed in a bath of 44 parts by weight of water, 0.1 part by weight of the dyestuff obtained according to the description of Example 2, 3.4 parts by weight of a mixture of o-, m- and p-cresotic acid methyl ester and 0.6 part by weight of a mixture of equal parts of aralkyl sulfonate and the non-ionic polyglycol ether after addition of sulfuric acid to establish a pH of 4.5, for two hours at 96–98° C. It is further rinsed and dried.

The fastness to rubbing of the dyeing can be improved if it is aftertreated for 10–30 minutes in a gently boiling bath which contains 5.5 parts by weight of caustic acid of 38° Bé., two parts by weight of sodium dithionite and one part by weight of a polyglycol ether of a fatty acid amide.

A greenish blue dyeing is obtained with very good fastness to light and heat. In a similar way the dyestuff obtained according to Examples 1, 3 and 4 may be used for dyeing.

Fast blue dyeings are likewise obtained on polyethylene glycol terephthalate if in this example, dyeing is carried out for one hour at 120–130° C. instead of 2 hours at 96–98° C.

EXAMPLE 8

10 parts by weight of rope material of cellulose triacetate are dyed at 96–98° C. for one hour in a bath which contains 400 parts by weight of water, 0.2 part by weight of the finely divided dyestuff from Example 2, 3.4 parts by weight of a mixture of o-, m- and p-cresotic acid methyl ester and 0.6 part by weight of a mixture of equal parts of aralkyl sulfonate and a non-ionic polyglycol ether, after adjusting the pH with formic acid to 4.5. A blue dyestuff is obtained with very good fastness properties.

In the same way dyeing may be carried out with a dyestuff obtained according to Examples 1, 3 and 4. Instead of the dyestuff mixtures there can be used with similar good results the dyestuff component which forms the larger part of the dyestuff mixtures.

Instead of dyeing for one hour at 96–98° C. one can also dye for one hour at 120–130° C.

EXAMPLE 9

10 parts by weight of rope material of synthetic polyamide are dyed for an hour at the boil in a bath containing 400 parts by weight of water, 0.2 part by weight of the finely divided dyestuff of Example 2 and 0.2 part by weight of a customary dispersing agent after heating slowly to boiling. It is then rinsed, optionally weakly soaped and dried. A blue dyestuff is obtained with good fastness properties. In the same way, dyeing can be carried out with a dyestuff obtained according to Examples 1, 3 and 4. Here again there can be used the main dyestuff component of the above mixtures.

EXAMPLE 10

If a dyestuff mixture obtained according to Example 5 is used for dyeing according to the description of Example 7, a corinth colored dyeing is obtained of very good fastness to light and to sublimation.

EXAMPLE 11

If the dyestuff mixture obtained according to Example 6 is used for dyeing according to Example 7, a greenish blue dyeing is obtained of very good fastness properties. Compared with the dyestuff obtained according to Example 1, the dyeing of this dyestuff is distinguished by a somewhat greener shade and improved fastness to sublimation.

EXAMPLE 12

10 parts by weight of rope material of polyethylene glycol terephthalate are dyed for two hours at 96–98° C. in a bath of 400 parts by weight of water, 1.3 parts by weight of a finely divided dyestuff obtained according to the description of Example 6, 0.7 part by weight of a finely divided dyestuff obtained according to Example 5, 3.4 parts by weight of a mixture of o-, m- and p-cresotic acid methyl ester and 0.6 part by weight of a mixture of equal parts of aralkyl sulfonate and a non-ionic polyglycol ether, after the addition of sulfonic acid to establish a pH of 4.5. It is then rinsed and dried.

A marine blue dyeing is obtained with very good light and wet fastness. In a similar way the dyestuff according to Examples 5 and 6 can be used for dyeing in other mixture ratios, to obtain fast reddish or greenish marine blue dyeings.

Likewise greenish blue dyeings are obtained on polyethylene glycol terephthalate, by dyeing for one hour at 120–135° C. in this example instead of for two hours at 96–98° C.

We claim:

1. Process for producing aryl-substituted hydroxy anthraquinones comprising reacting a boric acid ester of 1,5-dihydroxy-4,8-dinitro-anthraquinone with at least an equimolar amount of a phenyl reactant having as ring substituent at least one and at most two radicals selected from the group consisting of hydroxy and lower alkoxy, in the presence of sulfuric acid or a mixture thereof with a minor proportion of acetic acid at a temperature range of about −20° C. to 25° C.; hydrolyzing the boric acid ester moiety and recovering a corresponding product having the formula

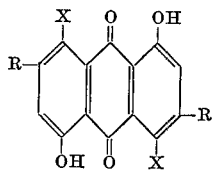

wherein

R is a member selected from the group consisting of H, lower alkoxy substituted phenyl, hydroxy phenyl, and dihydroxy phenyl, not more than one R group being defined as H; wherein X is defined as —$NO_2$ or $NH_2$ in the 4-position and as —$NO_2$ in the 8-position of the anthraquinone radical.

2. Process according to claim 1 wherein the phenyl reactant is a member selected from the group consisting of phenol, anisole, phenetole and resorcinol.

3. The process of claim 1 wherein the acid condensing agent is concentrated sulfuric acid.

4. The process of claim 1 wherein nitro substituents on the 4- or 8-positions of the anthraquinone ring are subsequently reduced to a corresponding 4,8-diamine radical.

References Cited

UNITED STATES PATENTS

| | | | |
|---|---|---|---|
| 3,043,646 | 7/1962 | Buecheler | 260—380X |
| 3,265,460 | 8/1966 | Hoare | 8—39 |
| 3,270,013 | 8/1966 | Hindermann et al. | 260—247.1 |

FOREIGN PATENTS

| | | | |
|---|---|---|---|
| 76,262 | 7/1894 | Germany | 260—380 |
| 456,235 | 2/1928 | Germany | 260—380 |
| 1,345,377 | 10/1963 | France | 260—380 |

OTHER REFERENCES

Chemical Abstracts, vol. 56, January–June 1962, Subject Index, p. 196.

Houben: "Das. Anthracen Und. Die Anthraquinone," 1929, pp. 408–409.

LORRAINE A. WEINBERGER, Primary Examiner

R. GERSTL, Assistant Examiner

U.S. Cl. X.R.

8—39, 40; 260—376, 383

Disclaimer 3,549,667.—*Klaus Wunderlich* and *Hans-Samuel Bien*, Leverkusen, and *Fritz Baumann*, Opladen, Germany. PREPARATION OF ARYL SUBSTITUTED HYDROXY ANTHRAQUINONES. Patent dated Dec. 22, 1970. Disclaimer filed Mar. 13, 1974, by the assignee, *Bayer Aktiengesellschaft*.

Hereby enters this disclaimer to claims 1-4 of said patent.

[*Official Gazette April 22, 1975.*]